United States Patent [19]

Britt et al.

[11] Patent Number: 4,487,631
[45] Date of Patent: Dec. 11, 1984

[54] SHOT-FREE MILLBOARD

[75] Inventors: James M. Britt, Martinez, Ga.; Steve A. LaPrade, North Augusta, S.C.; John T. Martin, Waynesboro, Ga.

[73] Assignee: The Babcock & Wilcox Company, New Orleans, La.

[21] Appl. No.: 522,436

[22] Filed: Aug. 11, 1983

[51] Int. Cl.³ .............................................. C04B 19/04
[52] U.S. Cl. ........................................ 106/80; 106/84
[58] Field of Search .............................. 106/80, 84

[56] References Cited

U.S. PATENT DOCUMENTS

| | | | |
|---|---|---|---|
| 1,594,417 | 8/1926 | Kobbe | 106/99 |
| 1,678,345 | 7/1928 | Mattison | 106/99 |
| 3,334,010 | 8/1967 | Moore | 106/99 |
| 4,101,335 | 7/1978 | Barrable | 106/99 |
| 4,132,555 | 1/1979 | Barrable | 106/90 |
| 4,308,070 | 12/1981 | Cavicchio | 106/99 |

Primary Examiner—James Poer
Attorney, Agent, or Firm—Mark B. Quatt; Robert J. Edwards

[57] ABSTRACT

A shot-free millboard is asbestos-free and also free of unfiberized material, or shot, which can cause miscrosopic defects in glass sheet. The millboard of the present invention is suitable for use as float roll covering material.

2 Claims, No Drawings

SHOT-FREE MILLBOARD

BACKGROUND OF THE INVENTION

Millboard has been used commercially for many years. It serves as thermal insulation in gaskets, linings for fire-safe cabinets, and in the glass making industry as a float roll covering material.

In the past, asbestos fibers of either the chrysotile or amphibole type have been incorporated into the starting mixture for such boards.

U.S. Pat. No. 1,594,417 (Kobbe) shows the use of a short-fibre asbestos combined with a cement binding agent and congealed sulfur to produce a high-resilient, tough, high-strength millboard.

U.S. Pat. No. 1,678,345 (Mattison) incorporates asbestos fibers into a mixture of hydraulic and calcium and aluminum carbonate to produce a millboard product.

U.S. Pat. No. 3,334,010 (Moore) utilizes both chrysotile asbestos and crocidolite (amphibole) asbestos in a millboard product.

These fibers strengthen the resulting product and provide heat resistance in high-temperature applications.

Asbestos has been shown to be a health hazard, however, and it is therefore desireable to find a suitable material for millboard use which does not contain asbestos fibers.

Asbestos-free millboard products have been developed to meet this need. One example is U.S. Pat. No. 4,308,070 (Cavicchio) which discloses a combination of a cellulosic fiber, barytes (barium sulphate), cement, and an inorganic filler such as talc, diatomaceous earth, silicates, and carbonates.

Millboards composed of washed ceramic fiber and incorporating various fillers have also been used as roll coverings for float line rolls in the manufacture of glass. These materials contain approximately twenty percent of unfiberized material, or shot, of a size less than 100 mesh (0.0059 inches). This unfiberized material causes microscopic defects in the glass sheet as it passes over the float line rolls. Another disadvantage is that these millboard products become dusty once the binder is removed.

SUMMARY OF THE INVENTION

The present invention overcomes the disadvantages of the prior art by a composition which is asbestos-free and also free of unfiberized material, or shot, and which reduces dust.

A millboard according to the present invention comprises in combination between 5% and 25% by weight of a glass fiber; between 3% and 5% by weight of an organic fiber; between 45% and 65% by weight of a ball clay; between 0% and 20% by weight of bentonite; between 10% and 20% by weight of calcium carbonate; between 0% and 15% by weight of pyrophyllite; between 10% and 18% by weight of sodium silicate; between 5% and 10% by weight of starch; between 0% and 10% by weight of colloidal silica; and between 0% and 15% by weight of hydrated lime.

DESCRIPTION OF THE PREFERRED EMBODIMENTS

A preferred formulation for a millboard in accordance with the present invention includes about 10% glass fiber. About 50% of this fiber has a length of about 0.125% inches, and about 50% of this glass fiber has a length of about 0.25 inches.

The organic fiber used is preferably a fine polyethylene fiber such as Pulp XE Polyethylene, present in about 3% by weight of the formulation.

The bentonite is present at about 5% of formulation weight, and is of the sodium variety.

The ball clay may be an M&D ball clay comprising about 47% of the formulation.

The sodium silicate preferably is present at about 10% by weight of the formulation. An example of a suitable sodium silicate is SS 65 Sodium Silicate.

Calcium carbonate is preferably present at about 20% by weight of the formulation, and of Q1 grade.

The starch is present at about 5% by weight, and e.g. Solvatos N starch is suitable for the practice of this invention.

A chemical analysis of a millboard in accordance with the preferred embodiment yields the following analysis: about 22% by weight of alumina; about 55% by weight of silica; about 4% by weight of ferric oxide; about 0.8% by weight of titanium oxide; about 0.9% by weight of magnesium oxide; about 18% by weight of calcium oxide; about 2.3% by weight of combined alkalies; about 13.2% by weight loss on ignition at 1000° F.; and a moisture content of about 2%.

The millboard of the preferred embodiment has excellent insulating characteristics and is suitable as a replacement for asbestos millboard. It has a density of about 70 pounds per cubic feet, and maintains a very low thermal conductivity up to its use limit of about 1500° F. This millboard has a modulus of rupture of about 1000 pounds per square inch (psi) and a tensile strength of about 1500 psi.

Compressive strength at deformation of 5% is about 200 psi; at 10% deformation, 800 psi; and at 25% deformation, 4300 psi. This millboard can withstand a much greater deformation under compression than conventionally manufactured ceramic fiber boards.

This millboard is suitable not only for float roll covering in the glass-making industry, but also for such uses as low pressure air gasketing, fire protection panels, thermal barriers in wood-burning stoves, welding glare and spark shields, personnel protection, as a back-up insulation material for rotary kilns, and in teeming ladles in the steel and aluminum industries. The relatively thin dimension of the board combined with its thermal insulating characteristics makes it very suitable for use as a back-up insulation for kilns, crucibles, teeming ladles and induction furnaces.

In use as a back-up insulation in a rotary kiln, the millboard of the present invention has shown several advantages over the prior art. In the past, asbestos paper had been used as a back-up material, applied to the cold face side of a rotary kiln lining. Ceramic fiber paper is currently being offered as a replacement for asbestos paper. Experience has shown that this ceramic fiber paper has not proven totally satisfactory as a back-up material. In rotary kilns which are constructed so that their entire length is subject to variations in ambient conditions, pinch spalling can occur. Both expansion and contraction of the metal shell and the working lining causes the ceramic fiber paper to crush and eventually disintegrate, rendering it useless as an insulating material. When this occurs, the working lining may become loose, causing far greater problems.

The use of the millboard of the present invention generally reduces the problem of pinch spalling and therefore reduces the wear on the working lining. This is because it is able to withstand much higher compressive loads as well as repeated cycling with little or no degradation.

Capping or spalling of the inside face of refractory brick lining is reduced or eliminated because of the cushioning effect of the millboard between the brick liner and the kiln's steel shell.

Additional advantages include the inherent fuel savings which accompanies the presence of the millboard, ease of installation, promotion of worker comfort inside the kiln during lining installation; and reduction of installation costs. This millboard is also suitable for use as a back-up insulation in lime kilns, cement kilns, and calciners.

The characteristic high compression strength and thermal insulation efficiency, as well as the shot-free nature of the glass fibers used in the manufacture of the millboard of the present invention, make it highly suitable as a float line roll covering material for the manufacture of glass. The millboard can be produced by for example vacuum forming or by use of various paper and board making machinery such as wet machines, rotoformers, or Fourdriniers.

In the manufacture of millboard using a wet machine, the starting stock is pumped to a vat on the machine at typically 0.1% to 0.3% consistency (% by weight of solids). A thin ply of material called a web is formed on the wire of a rotating cylinder partially immersed in the stock present in the vat. The web is a result of a differential pressure created between the stock level outside the cylinder in the vat and inside the cylinder. The water level inside the cylinder is controlled by regulating the effluent flow. The greater the flow, the more material which passes through the wire on the cylinder and the thicker the webs. The web is transferred from the wire to a felt, then from the felt to a make roll. The web is then wrapped on to the make roll until the desired thickness (lap) is achieved. At this point, the lap is cut lengthwise on the make roll and removed to be dried. The structure of the lap is thus multi-layered and each layer approximately 0.005 inches thick.

In the manufacture of millboard using a rotoformer, the starting stock is pumped to a head box on the rotoformer at a consistency of from 0.1% to 0.3% (% by weight of solids). A vacuum is pulled through the wire of a cylinder while the cylinder rotates. This causes a web of material to be formed on the wire. At this point the web is transferred to drying cans. The resulting structure is a single, monolithic layer.

The roll bodies used to convey sheet steel, aluminum, and glass can be made of either carbon steel (for low temperature applications), stainless steel (for intermediate temperatures) and water cooled carbon steel (for high temperatures). The roll covering itself is fabricated by die cutting circular discs from millboard sheets. The inside diameter of the discs is about 0.06 inches larger than the outside diameter of the roll body. The outside diameter of the discs is typically between four and six inches larger than the inside diameter. The roll covering is constructed by putting the discs on the roll body and compressing them typically 22–26%. This is normally done in steps, with more material added after each compression. After the material is in place, it is machined on a lathe to the finished roll diameter.

In the preparation of millboard in accordance with the invention, using for example the wet machine or rotoformer apparatus and procedures described above, suitable flocculating agents are added to the mix. The addition of flocculating agents is well known in the art; typically about 1.25% by weight of a flocculating agent is added. Examples of such agents are colloidal silica and starch.

What is claimed is:

1. A shot-free millboard comprising in combination:
   (a) 5% to 25% by weight of a glass fiber;
   (b) 3% to 5% by weight of an organic fiber;
   (c) 45% to 65% by weight of a ball clay;
   (d) 0% to 20% by weight of bentonite;
   (e) 10% to 20% by weight of calcium carbonate;
   (f) 0% to 15% by weight of pyrophyllite;
   (g) 10% to 18% by weight of sodium silicate;
   (h) 5% to 10% by weight of starch;
   (i) 0% to 10% by weight of colloidal silica; and
   (j) 0% to 15% by weight of hydrated lime.

2. A shot-free millboard comprising in combination:
   (a) about 5% by weight of glass fiber having a length of about 0.125 inches;
   (b) about 5% by weight of glass fiber having a length of about 0.25 inches;
   (c) about 3% by weight of polyethylene fiber;
   (d) about 5% by weight of sodium bentonite;
   (e) about 47% by weight of ball clay;
   (f) about 10% by weight of sodium silicate;
   (g) about 20% by weight of calcium carbonate; and
   (h) about 5% by weight of starch.

* * * * *